UNITED STATES PATENT OFFICE.

WALTHER FELD, OF HÖNNINGEN-ON-THE-RHINE, GERMANY.

PROCESS OF TREATING COAL-GAS FOR EXTRACTING TAR, WATER, AND AMMONIA.

No. 830,983.　　　　Specification of Letters Patent.　　　Patented Sept. 11, 1906.

Application filed January 4, 1906. Serial No. 294,668.

*To all whom it may concern:*

Be it known that I, WALTHER FELD, chemist and manufacturer, a subject of the King of Prussia, German Emperor, residing at Hönningen-on-the-Rhine, in the Kingdom of Prussia, German Empire, have invented new and useful Improvements in the Treatment of Coal-Gas and Analogous Gases for the Extraction of Ammonia Therefrom, of which the following is a specification.

Hitherto tar has been separated from illuminating-gases and the like which contain tar, water, and ammonia by cooling the gases to a low temperature—say from 20° to 25° centigrade—so that the water in the gases is condensed at the same time as the tar. The objection to this method is, however, that the tar cannot be completely separated from the gases by the cooling process alone and to separate the ammonia from the water which is condensed in this cooling process requires the expense of handling a quantity of water altogether out of proportion to the value of the ammonia contained therein, especially in view of the poor quality of the ammonia obtained. For this reason the recovery of ammonia from such gases is in many cases impracticable. These disadvantages are obviated by my invention.

I first completely separate the tar from the gases at such a temperature that no ammonia is absorbed by the tar. I then separate the water from the gases without carrying away ammonia with this water. Having thus separated the tar and water from the gases, the said gases still contain their original amount of ammonia. This I extract by means of acids or salt solutions and obtain the ammoniacal solutions undiluted by the water of the gases and not mixed with tarry matters and other impurities. I have found that this separation of tar and water can be effected by special treatment of the gases first with the tar which has been already separated from the gases and then with water separated from the gases, this treatment being performed at a temperature above 40° centigrade. At this temperature most of the ammonia compounds present in the gases—such as the carbonate, cyanid, and sulfid—are volatile or decomposed and only a small part of them can be formed and dissolved in the tar and in the water which have been separated from the gases. The higher therefore above 40° centigrade that the temperature of the gases is kept in separating the tar and water therefrom the less will be the amount of ammonia absorbed by the tar and condensed water. This separation of the tar may be secured at a temperature even as high as 500° centigrade.

I may carry out my invention as follows: To separate the tar from the gases, the latter are cooled to a temperature under 500° centigrade, preferably between 100° and 200° centigrade, and at this temperature they are treated with a liquid which causes the tar to be condensed. The most suitable liquid for this operation is hot tar already condensed and separated, but still in the separator, the said tar being dispersed in the form of fine spray across the space through which the gases to be treated pass. Nearly the whole of the tar is thus separated from the gases without condensing the water suspended in the gases. In order to remove the last traces of tarry matter from the latter, however, they may be washed in a second apparatus at nearly the same temperature (under 500° and preferably between 100° and 200° centigrade) with tar-oil or thin tar or by an apparatus such as that known as the "Pelouse" apparatus. If the temperature of the gases passing the tar-washer were lower than 100° centigrade, some water would be condensed; but this would not absorb much ammonia so long as the temperature be kept above 40° centigrade. The gases thus freed from tar and being in a warm and moist condition enter the water-condenser. The separation of the water may be effected in a way similar to that in which the separation of tar was effected, as aforesaid—namely, by treating the gases with a liquid which causes the water contained in the gases in the form of vapors or suspended spray to condense in the form of drops. For this purpose the water condensed in effecting the separating of tar as aforesaid or in the cooler hereinafter referred to may be used, and this water may be warm or even hot. Preferably the water-condenser is so constructed that the water introduced into and that condensed in the condenser before leaving it is spread in the form of fine spray across the space through which the gases pass. If the gases contain fixed ammonia compounds, milk of lime is run into the condenser, together with the water, to prevent the absorption of the ammonia by the latter. If the temperature of the condensed water leaving the condenser be not high enough to decompose the fixed ammonia compounds, steam can be blown into the water before it leaves the condenser, or the said water may be heated in any other convenient way. The main part of the water is thus separated from the gases without carrying away ammonia. It is most advantageous to conduct the process in such a way that the gases entering the condenser have a temperature from 90° to 150° centigrade or even a higher temperature, in which case the condensed water leaves the condenser so hot that no steam is necessary to decompose the ammonia compounds in the water, thus keeping the water free from ammonia.

The following is an example of how the separation of water is effected. If coke-works coal containing twelve per cent. of water be distilled and if from this coal three hundred cubic meters of gases be produced per ton of such coal, the said gases contain one hundred and twenty kilograms of water per three hundred cubic meters of gases or four hundred grams of water per cubic meter of the gases. If the gases enter the water-condenser at 120° centigrade and leave it at 65° centigrade, the gases, according to their capacity of saturation with water-vapors at 65° centigrade, leave the condenser still containing one hundred and sixty grams of water per cubic meter, two hundred and forty grams of water being condensed in the condenser. The gases coming from the condenser are cooled in the cooler from 65° to 40° centigrade and leave the cooler, according to their capacity of saturation, at 40° centigrade with fifty grams of water per cubic meter, one hundred and ten grams of water at 40° centigrade being condensed in the cooler. This water at 40° centigrade, separated in the cooler, is run into the water-condenser and is spread therein in the form of fine spray, and by passing through the condenser the water is heated from 40° to between 90° and 100° centigrade and gives off its ammonia to the gases, the gases on their way through the condenser giving off their heat to the water run in and being cooled from 120° to 65° centigrade. The gases, which may come from the cooler at 40° centigrade, are treated with a solution of a salt of an alkali, an earth alkali, magnesia, or the like, giving off ammonia and carbonic acid to the solutions in forming corresponding ammonia salts. For example, in washing with chlorid of magnesia the following reaction occurs:

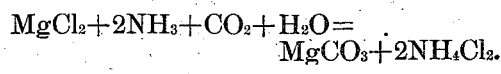

$$MgCl_2 + 2NH_3 + CO_2 + H_2O = MgCO_3 + 2NH_4Cl_2.$$

If the salt solution be run into the ammonia washer at 40° centigrade—that is to say, at the temperature of the gases to be washed—no moisture from the gas will be condensed in the salt solution, and this will not be diluted.

In working according to my invention, as hereinbefore described, the separation of tar will be complete, and the tar being free from water and ammonia will be more valuable than hitherto. The recovery of ammonia will be complete also, the ammonia being extracted uniformly and in the form of a liquor which is more concentrated and purer and more valuable than hitherto.

Having now particularly described and ascertained the nature of my said invention and the manner in which the same is to be performed, I declare that what I claim is—

1. A process for the extraction of tar and ammonia from gases containing tar, water and ammonia, consisting in first separating tar and then the water of distillation from the said gases, by treating the said gases at a temperature above 40° and under 500° centigrade with liquid capable of causing the tar and water respectively to take the form of drops and of precipitating these drops and, after thus separating tar and water, treating the said gases with an agent which will extract the ammonia from the said gases.

2. A process for the extraction of tar and ammonia from gases containing tar, water and ammonia, consisting in first separating from the said gases, tar at a temperature of from 100° to 200° centigrade and afterward separating, from the said gases, the water of distillation at a temperature above 40° and then treating the said gases with an agent which will extract the ammonia from the said gases.

3. A process for the extraction of tar and ammonia from gases containing tar, water and ammonia, consisting in effecting the separation of tar by treating the said gases, at a temperature above 40° centigrade and under 500° centigrade, with tar already separated from like gases, and spread, before it leaves the tar-separator, in the form of a fine spray across the space through which the gases to be treated pass, and then separating the water of distillation at a temperature above 40° centigrade and under 500° centigrade, and then treating the said gases with an agent which will extract the ammonia from the said gases.

4. A process for the extraction of tar and ammonia from gases containing tar, water and ammonia, consisting in first separating tar at a temperature above 40° centigrade and under 500° centigrade, and then separating water of distillation by treating the said gases at a temperature of from 90° to 150° centigrade, as aforesaid, so that the gases will be cooled to under 100° centigrade and then, after the gases have been subjected to a further cooling process, treating the said gases with an agent which will extract the ammonia from the said gases.

5. A process for the extraction of tar and ammonia from gases containing tar, water and ammonia, consisting in first separating tar at a temperature above 40° centigrade and under 500° centigrade, and then separating water of distillation by treating the gases as aforesaid, above 40° centigrade, with water coming from the cooler behind the separator and heating this water before leaving the water-separator in order to give off the ammonia absorbed in the cooler and to reconduct this ammonia into the said gases and then treating the said gases with an agent which will extract the ammonia from the said gases.

6. A process for the extraction of tar and ammonia from gases containing tar, water and ammonia, consisting in the separation of tar from gases by passing the gases through a spray of liquid tar at a temperature of from 100° to 500° centigrade, so that the tar is obtained free, or practically free, from water and ammonia.

7. A process for the extraction of tar and ammonia from gases, containing tar, water and ammonia, consisting in the separation of water from gases by passing the gases (after the removal of the tar) through a spray of water at a temperature above 40° and under 120° centigrade so that the water is separated without absorbing the ammonia and subsequently removing the ammonia from the gases.

8. A process for the extraction of tar and ammonia from gases, containing tar, water and ammonia and consisting in the obtainment from gases, of tar free, or practically free, from water and ammonia, and the subsequent obtainment of ammonia, by first passing the gases through a spray of liquid tar at a temperature of 100° to 500° centigrade and then through a spray of water at a temperature above 40° and under 120° centigrade and afterward absorbing the ammonia from the gases from which the tar and water have been separated.

In testimony whereof I have signed this specification in the presence of two subscribing witnesses.

WALTHER FELD.

Witnesses:
 BESSIE F. DUNLAP,
 LOUIS VANDORY.